US012720046B2

(12) United States Patent
Park

(10) Patent No.: US 12,720,046 B2
(45) Date of Patent: Aug. 25, 2026

(54) MOTION-COMPENSATED TEMPORAL FILTERING (MCTF) BLOCKING ARTIFACTS MITIGATION

(71) Applicant: Apple Inc., Cupertino, CA (US)

(72) Inventor: Jae Young Park, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 18/511,995

(22) Filed: Nov. 16, 2023

(65) Prior Publication Data

US 2025/0113025 A1 Apr. 3, 2025

Related U.S. Application Data

(60) Provisional application No. 63/586,302, filed on Sep. 28, 2023.

(51) Int. Cl.

| | |
|---|---|
| ***H04N 19/00*** | (2014.01) |
| ***H04N 19/105*** | (2014.01) |
| ***H04N 19/117*** | (2014.01) |
| ***H04N 19/139*** | (2014.01) |
| ***H04N 19/14*** | (2014.01) |
| ***H04N 19/182*** | (2014.01) |
| ***H04N 19/42*** | (2014.01) |
| ***H04N 19/80*** | (2014.01) |

(52) U.S. Cl.
CPC ......... *H04N 19/117* (2014.11); *H04N 19/105* (2014.11); *H04N 19/139* (2014.11); *H04N 19/14* (2014.11); *H04N 19/182* (2014.11); *H04N 19/42* (2014.11); *H04N 19/80* (2014.11)

(58) Field of Classification Search
CPC .. H04N 19/117; H04N 19/105; H04N 19/139; H04N 19/14; H04N 19/182; H04N 19/42; H04N 19/80
See application file for complete search history.

(56) References Cited

U.S. PATENT DOCUMENTS 8,280,641 B1 * 10/2012 Pellionisz .............. G16B 30/00 702/19
8,477,888 B2 * 7/2013 Lu ....................... H04W 52/243 375/346
8,891,619 B2 * 11/2014 Leontaris ............. H04N 19/154 375/240.03
9,036,695 B2 * 5/2015 Yang .................... H04N 19/172 375/240.12
9,251,475 B2 * 2/2016 Chen ..................... H04L 67/535
(Continued)

*Primary Examiner* — Frank F Huang
(74) *Attorney, Agent, or Firm* — Fletcher Yoder, P.C.

(57) ABSTRACT

An electronic device includes memory and motion compensated temporal filtering (MCTF) circuitry communicatively coupled to the memory. The MCTF circuitry is configured to receive a plurality of motion vectors. The MCTF circuitry is also configured to retrieve a plurality of source pixel values and a plurality of reference pixel values from the memory. The plurality of source pixel values and the plurality of reference pixel values correspond to the plurality of motion vectors. The MCTF circuitry is further configured to determine motion vector edge statistics based on the plurality of motion vectors. The MCTF circuitry is further configured to generate a plurality of filtered pixel values by filtering the plurality of source pixel values based on the plurality of reference pixel values and the motion vector edge statistics.

20 Claims, 11 Drawing Sheets

(56) References Cited

U.S. PATENT DOCUMENTS

| | | | | |
|---|---|---|---|---|
| 10,397,080 | B2 * | 8/2019 | Brik | H04L 47/20 |
| 10,448,014 | B2 | 10/2019 | Possos et al. | |
| 2006/0268933 | A1 * | 11/2006 | Kellerer | H04L 67/14 370/469 |
| 2008/0170793 | A1 * | 7/2008 | Yamada | H04N 21/236 382/232 |
| 2009/0028427 | A1 * | 1/2009 | Yamada | H04N 21/236 382/238 |
| 2009/0043547 | A1 * | 2/2009 | Kirby | G06F 17/175 703/2 |
| 2010/0246686 | A1 * | 9/2010 | Pezeshk | G11B 20/105 375/E7.027 |
| 2013/0286288 | A1 * | 10/2013 | Zhang | H04N 19/154 348/608 |
| 2015/0245071 | A1 | 8/2015 | Yang et al. | |
| 2018/0213233 | A1 * | 7/2018 | Koo | H04N 19/147 |
| 2019/0213915 | A1 * | 7/2019 | Tan | G09B 5/065 |
| 2020/0294401 | A1 * | 9/2020 | Kerecsen | G08G 1/205 |
| 2021/0160506 | A1 * | 5/2021 | Auyeung | H04N 19/70 |
| 2021/0235081 | A1 * | 7/2021 | Iwamura | H04N 19/176 |
| 2022/0044416 | A1 * | 2/2022 | Ji | G06T 7/20 |
| 2022/0174327 | A1 | 6/2022 | Michelsen et al. | |
| 2022/0224886 | A1 * | 7/2022 | Tsai | H04N 19/117 |
| 2023/0164358 | A1 | 5/2023 | Chiu et al. | |

* cited by examiner

MOTION-COMPENSATED TEMPORAL FILTERING (MCTF) BLOCKING ARTIFACTS MITIGATION

CROSS-REFERENCE TO RELATED APPLICATIONS

This application claims priority to U.S. Provisional Patent Application No. 63/586,302, filed Sep. 28, 2023, entitled “Motion-Compensated Temporal Filtering (MCTF) Blocking Artifacts Mitigation,” which is incorporated by reference herein in its entirety for all purposes.

BACKGROUND

The present disclosure generally relates to image processing, and, more particularly, to blocking artifacts mitigation.

Video image data and other image data may be encoded to facilitate efficient usage of resources such as transmission bandwidth or memory. Encoded image data may include artifacts or undesirable anomalies that degrade or otherwise negatively impact image quality. An encoding process may apply filtering operations to image data to improve image quality. For example, an encoding process may apply motion-compensated temporal filtering (MCTF) operations to image data such as video image data that includes motion. MCTF operations may be block-based that are applied to blocks of pixel data in image data. In some instances, image data may include spatial artifacts such as blocking artifacts related to MCTF operations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As described above, image data may include spatial artifacts (e.g., blocking artifacts) related to motion compensated temporal filtering (MCTF) operations. Motion field discontinuities associated with the image data may contribute to such spatial artifacts. Motion field discontinuities generally refer to abrupt changes in motion associated with neighboring blocks of pixel data within image data. For example, image data may include a first block of pixel data and a second block of pixel data that form neighboring blocks of pixel data within the image data. The first block of pixel data may be associated with a moving object (e.g., a child). The second block of pixel data may be associated with a stationary object or background (e.g., a slide). A first motion vector corresponding to the first block of pixel data may have a magnitude that is greater than a magnitude of a second motion vector corresponding to the second block of pixel data. A magnitude difference between the first and second motion vectors that exceeds a threshold may indicate a motion vector edge or motion field discontinuity associated with the image data. Applying MCTF operations to the image data with that motion vector edge or motion field discontinuity may cause spatial artifacts (e.g., blocking artifacts) in the image data.

Embodiments herein provide various apparatuses and techniques to reduce spatial artifacts related to temporal filtering operations. To that end, the embodiments disclosed herein include MCTF circuitry configured to perform edge detection operations on motion vectors associated with image data to reduce blocking artifacts or other spatial artifacts related to MCTF operations. The edge detection operations performed by the MCTF circuitry may involve comparing magnitudes of motion vectors corresponding to neighboring blocks of pixel data comprising the image data. A filtering strength of MCTF operations may be adjusted based on a magnitude difference between those motion vectors. The filtering strength may be inversely related to the magnitude difference. In this way, blocking artifacts or other spatial artifacts related to MCTF operations may be reduced by reducing pixel data blending proximate to motion vector edges or motion field discontinuities.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

When introducing elements of various embodiments of the present disclosure, the articles “a,” “an,” and “the” are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," "proximate to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

Figure 1:
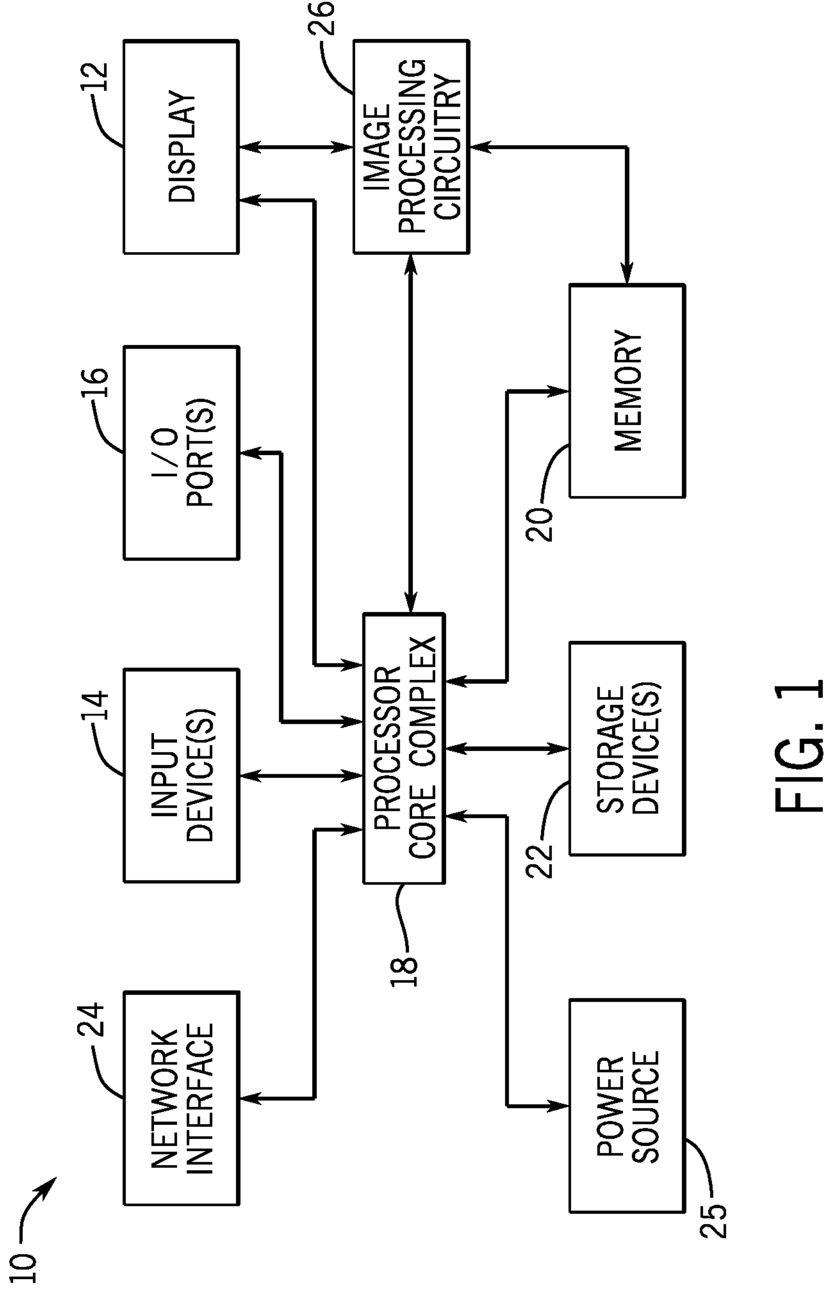
FIG. 1 is a block diagram of an electronic device, in accordance with an embodiment.

With the foregoing in mind, FIG. 1 shows an example of an electronic device 10 that may benefit from MCTF circuitry configured to perform edge detection operations on motion vectors associated with image data to reduce blocking artifacts or other spatial artifacts related to MCTF operations. The electronic device 10 may be any suitable electronic device, such as a computer, a mobile phone, a portable media device, a tablet, a television, a virtual-reality headset, a wearable device such as a watch, a vehicle and/or vehicle dashboard, or the like. FIG. 1 is intended to represent one example of a particular implementation and is intended to illustrate the types of components that may be present in the electronic device 10.

The electronic device 10 of FIG. 1 includes an electronic display 12, one or more input devices 14, one or more input/output (I/O) ports 16, a processor core complex 18 having one or more processor(s) or processor cores, local memory 20, a main memory storage device 22, a network interface 24, a power source 25 (e.g., power supply), and image processing circuitry 26. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component. In another example, the image processing circuitry 26 may be a component of the processor core complex 18, a separate module, or a component of the electronic display 12.

The processor core complex 18 is operably coupled with the local memory 20 and the main memory storage device 22. Thus, the processor core complex 18 may execute instructions stored in the local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18 such as image data. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 25 may provide electrical power to one or more components of the electronic device 10, such as the processor core complex 18 or the electronic display 12. Thus, the power source 25 may include any suitable source of energy, such as a rechargeable lithium polymer (Li-poly) battery or an alternating current (AC) power converter. A power management integrated circuit (PMIC) may control the provision and generation of electrical power to the various components of the electronic device 10.

The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch-sensing components may receive user inputs by detecting occurrence or position of an object touching the surface of the electronic display 12.

The electronic display 12 may include a display panel including pixel circuitry with an array of display pixels and power supply circuitry with a number of independent supply tiles. The electronic display 12 may control light emission from the display pixels to provide visual representations of information, such as a graphical user interface (GUI) of an operating system, an application interface, a still image, or video content, by displaying frames of image data. To display images, the electronic display 12 may include display pixels implemented on the display panel. The display pixels are sub-pixels that each control a luminance value of a color component (e.g., a red component, a green component, or a blue component for a red-green-blue (RGB) pixel arrangement and/or a red component, a green component, a blue component, or a white component for a red-green-blue-white (RGBW) pixel arrangement).

The electronic display 12 may display an image by controlling light emission from its display pixels based on image data associated with corresponding display pixels in the image. In some embodiments, image data may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display frames based on image data generated by the processor core complex 18, or the electronic display 12 may display frames based on image data received via the network interface 24, an input device, an image sensor, or an I/O port 16.

Figure 2:
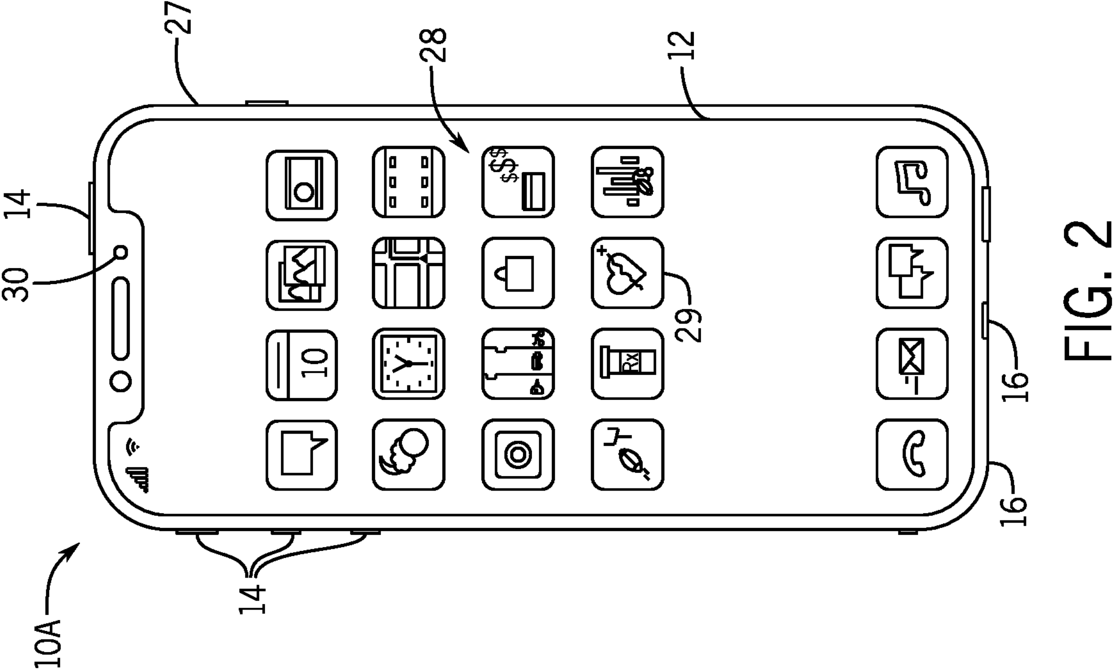
FIG. 2 is a front view of a mobile phone representing an example of the electronic device of FIG. 1, in accordance with an embodiment.

The electronic device 10 may take any suitable form. One example of the electronic device 10 in the form of a handheld device 10A is shown in FIG. 2. The handheld device 10A may be a portable phone, a media player, a personal data organizer, a handheld game platform, or the like. For illustrative purposes, the handheld device 10A may be a smartphone, such as any IPHONE® model available from Apple Inc. The handheld device 10A includes an enclosure 27 (e.g., housing). The enclosure 27 may protect interior components from physical damage or shield them from electromagnetic interference, such as by surrounding the electronic display 12. The electronic display 12 may display a graphical user interface (GUI) 28 having an array of icons. When an icon 29 is selected either by an input device 14 or a touch-sensing component of the electronic display 12, an application program may launch. The input devices 14 may be accessed through openings in the enclosure 27. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes. The electronic display 12 may also display image data may be generated by an image source, such as the processor core complex 18, a graphics processing unit (GPU), or an image sensor (e.g., image sensor 30).

Figure 3:
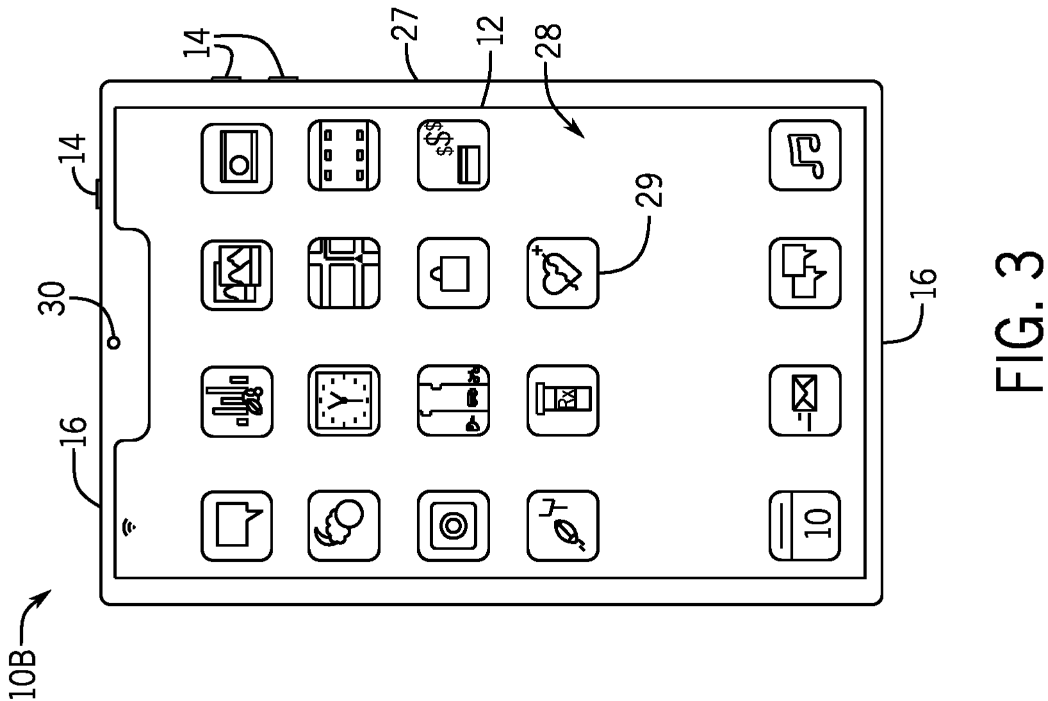
FIG. 3 is a front view of a tablet device representing an example of the electronic device of FIG. 1, in accordance with an embodiment.
Figure 4:
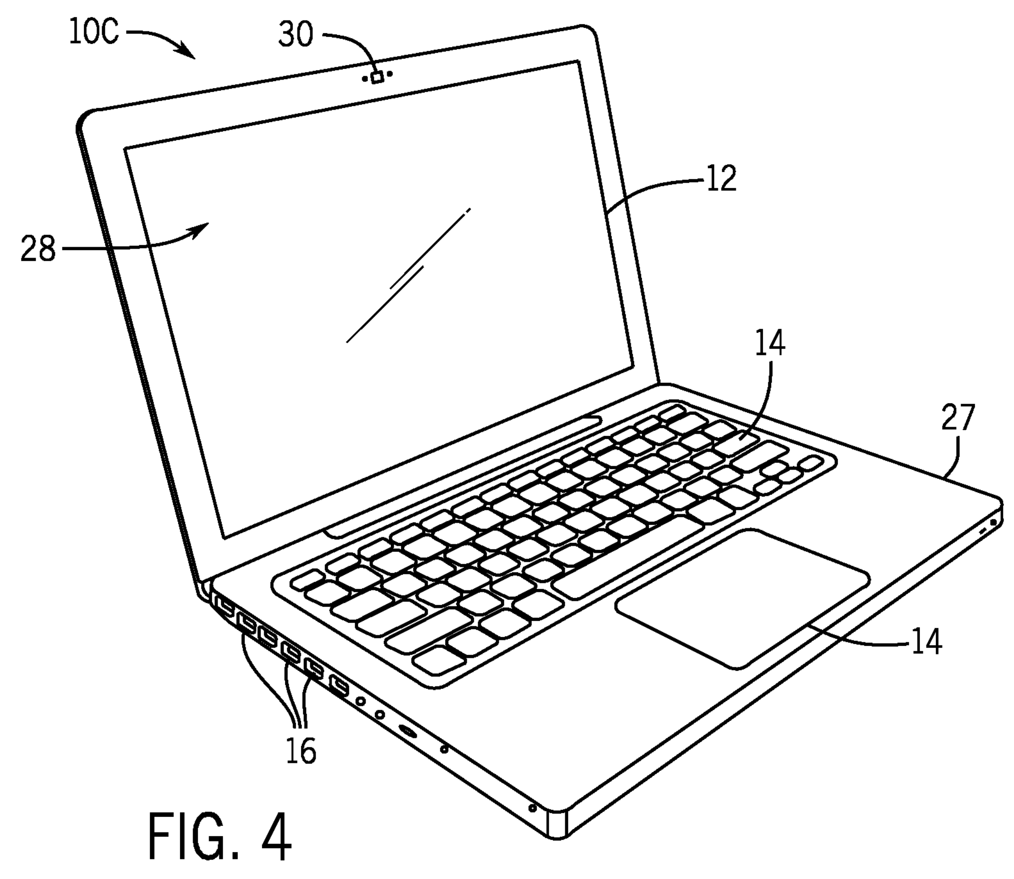
FIG. 4 is a front view of a notebook computer representing an example of the electronic device of FIG. 1, in accordance with an embodiment.
Figure 5:
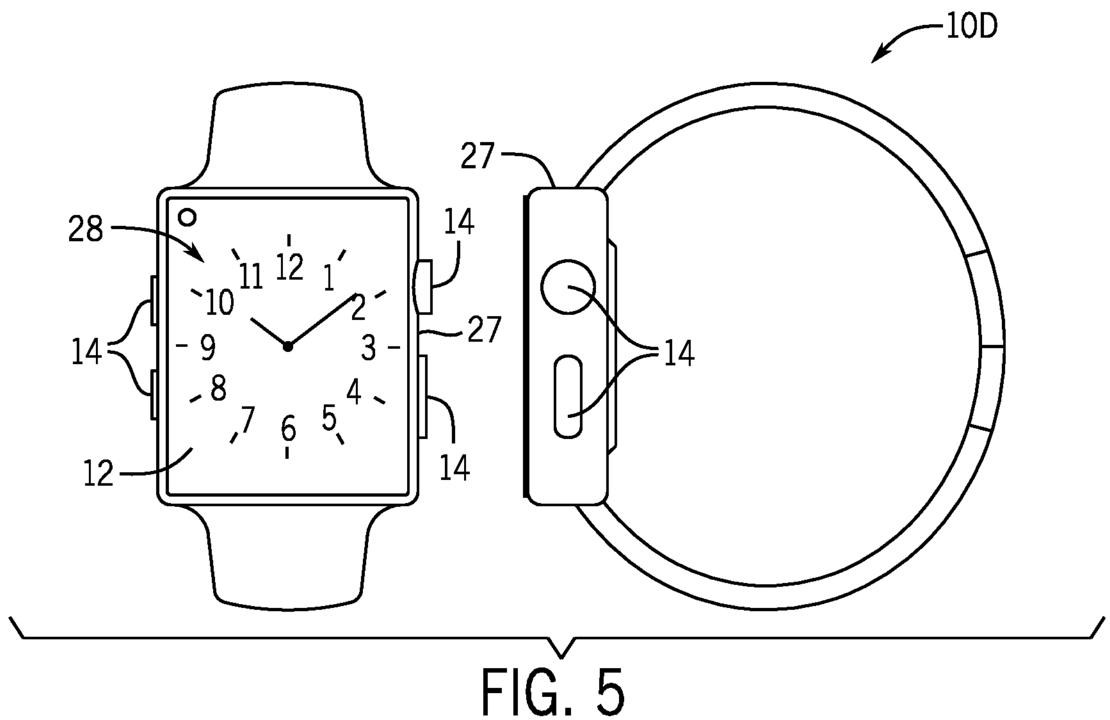
FIG. 5 are front and side views of a watch representing an example of the electronic device of FIG. 1, in accordance with an embodiment.

Another example of the electronic device 10, specifically, a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of the electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 27. The electronic display 12 may display a GUI 28. Here, the GUI 28 shows a visualization of a clock. When the visualization is selected either by the input device 14 or a touch-sensing component of the electronic display 12, an application program may launch, such as to transition the GUI 28 to presenting the icons 29 discussed in FIGS. 2 and 3. The electronic display 12 may also display image data may be generated by an image source, such as the processor core complex 18, a graphics processing unit (GPU), or an image sensor (e.g., image sensor 30).

Figure 6:
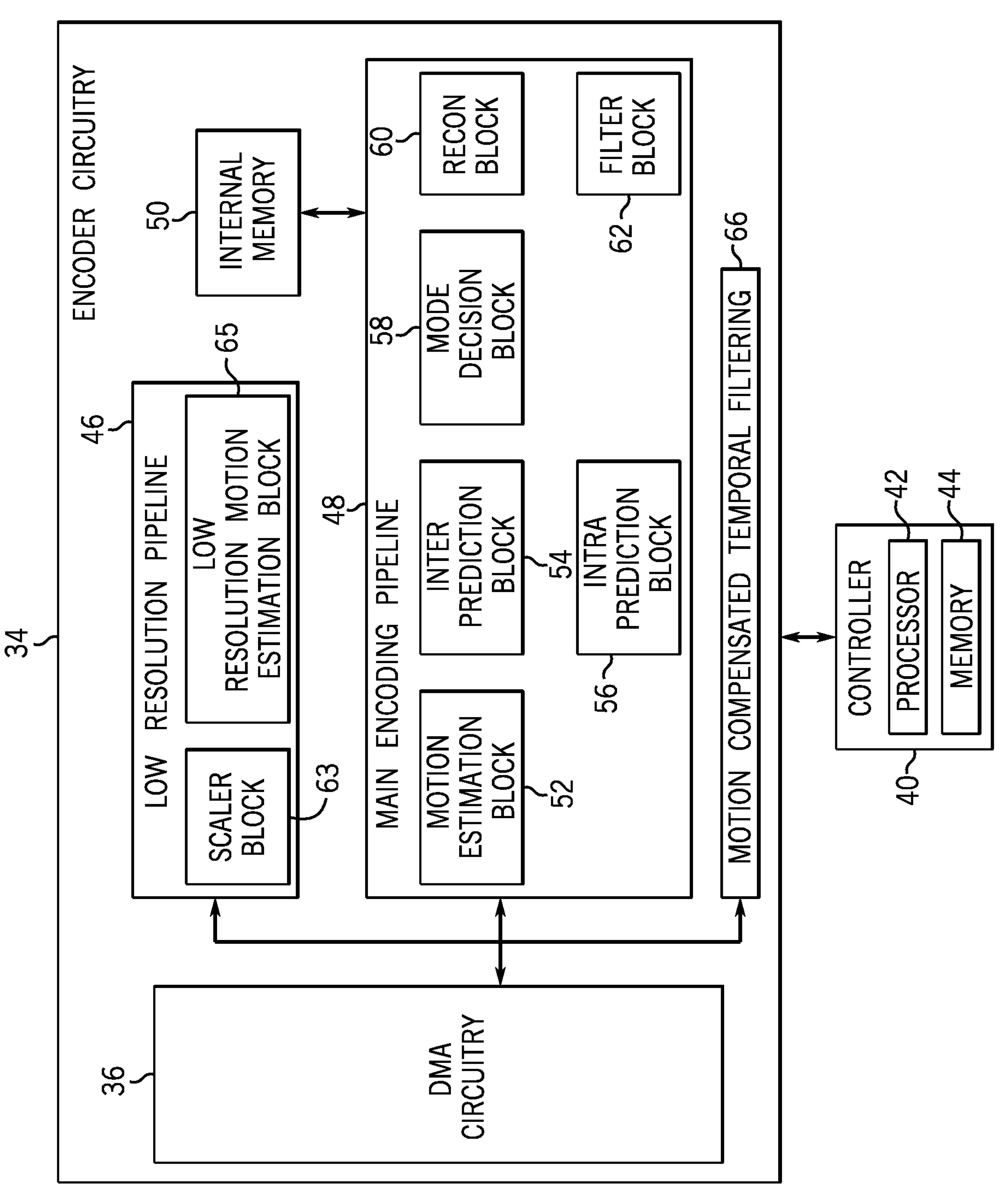
FIG. 6 is block diagram that illustrates a portion of the electronic device of FIG. 1 with encoder circuitry, in accordance with an embodiment.

FIG. 6 illustrates an example implementation of a portion of the electronic device 10 that includes encoder circuitry 34. In an embodiment, the encoder circuitry 34 may be implemented using one or more of a system-on-chip (SoC), the processor core complex 18, and a timing controller in the electronic display 12. The encoder circuitry 34 may be communicatively coupled to a controller 40 that includes a processor 42 and memory 44. The controller 40 may be configured control operation of the encoder circuitry 34 based on instructions executed by the processor 42. Such instructions executed by the processor 42 may be hardwired into the processor 42, stored in the memory 44, and/or stored in any suitable article of manufacture that includes one or more tangible, non-transitory computer-readable media. In an embodiment, the memory 44 may be included in the local memory 20, the main memory storage device 22, and/or a separate, tangible, non-transitory computer-readable medium (e.g., in the electronic display). Although depicted as a single controller in FIG. 6, the controller 40 may be implemented as one or more separate controllers in other embodiments that may each be used to control operation of the encoder circuitry 34. In an embodiment, the controller 40 may be implemented in the encoder circuitry 34, for example, as a dedicated image encoding controller.

The encoder circuitry 34 may include direct memory access (DMA) circuitry 36. In some embodiments, the DMA circuitry 36 may communicatively couple the encoder circuitry 34 to an image sensor (e.g., image sensor 30) and/or external memory that stores source image data, for example, image data generated by the image sensor 30 or received via the network interface 24 or the I/O ports 16. For example, the external memory may be the local memory 20 or the main memory storage device 22.

The encoder circuitry 34 may be configured to encode source image data to generate encoded (e.g., compressed) image data and to provide encoded image data for further processing (e.g., storage and/or transmission) to an output communicatively coupled to the encoder circuitry 34. In an embodiment, the output may include one or more of the local memory 20, the main memory storage device 22, the network interface 24, the I/O ports 16, and the memory 44. The encoder circuitry 34 may also include multiple parallel pipelines to generate encoded image data. In FIG. 6, low-resolution pipeline 46 and main encoding pipeline 48 represent those multiple parallel pipe lines of the encoder circuitry 34.

The main encoding pipeline 48 may be configured to encode source image data using prediction techniques (e.g., inter prediction techniques or intra prediction techniques). The main encoding pipeline 48 may perform various functions to enable prediction encoding of source image data. To simplify discussion, those functions are divided between various blocks (e.g., circuitry, modules) in the main encoding pipeline 48. In FIG. 6, the main encoding pipeline 48 includes a motion estimation block 52, an inter prediction block 54, an intra prediction block 56, a mode decision block 58, a reconstruction block 60, and a filter block 62.

The motion estimation block 52 may be communicatively coupled to the DMA circuitry 36. In this manner, the motion estimation block 52 may receive source image data via the DMA circuitry 36, which may include a luma component (e.g., Y) and two chroma components (e.g., Cr and Cb). In some embodiments, the motion estimation block 52 may process one coding tree unit (CTU), including one luma coding block and two chroma coding blocks, at a time. As used herein a “luma coding block” describes the luma component of a CTU and a “chroma coding block” describes a chroma component of the CTU.

A luma coding block may be the same resolution as the CTU. On the other hand, the chroma coding blocks may vary in resolution based on chroma sampling format. For example, using a 4:4:4 sampling format, the chroma coding blocks may be the same resolution as the CTU. However, the chroma coding blocks may be half (e.g., half resolution in the horizontal direction) the resolution of the CTU when a 4:2:2 sampling format is used and a quarter (e.g., half resolution in the horizontal direction and half resolution in the vertical direction) the resolution of the CTU when a 4:2:0 sampling format is used.

As described above, a CTU may include one or more prediction units, which may each be encoded using the same prediction technique, but different prediction modes. Each prediction unit may include one luma prediction block and two chroma prediction blocks. As used herein a “luma prediction block” describes the luma component of a prediction unit and a “chroma prediction block” describes a chroma component of the prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter prediction modes that can be used to encode a prediction unit. An inter prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter prediction mode, the motion estimation block 52 may search reconstructed luma image data, which may be previously generated by the reconstruction block 60 and stored in internal memory 50 (e.g., reference memory) of the encoder circuitry 34. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to a position of the prediction unit in the current frame. In some embodiments, the motion vector may be expressed as (mvX, mvY), where mvX is horizontal offset and mvY is a vertical offset between the prediction unit and the reference sample. The values of the horizontal and vertical offsets may also be referred to as x-components and y-components, respectively.

In this manner, the motion estimation block 52 may determine candidate inter prediction modes (e.g., reference index and motion vector) for one or more prediction units in the CTU. The motion estimation block 52 may then input candidate inter prediction modes to the inter prediction block 54. Based at least in part on the candidate inter prediction modes, the inter prediction block 54 may determine luma prediction samples (e.g., predictions of a prediction unit).

The inter prediction block 54 may determine a luma prediction sample by applying motion compensation to a reference sample indicated by a candidate inter prediction mode. For example, the inter prediction block 54 may apply motion compensation by determining luma of the reference sample at fractional (e.g., quarter or half) pixel positions. The inter prediction block 54 may then input the luma prediction sample and corresponding candidate inter prediction mode to the mode decision block 58 for consideration. In some embodiments, the inter prediction block 54 may sort the candidate inter prediction modes based on associated mode cost and input only a specific number to the mode decision block 58.

The mode decision block 58 may also consider one or more candidate intra predictions modes and corresponding luma prediction samples output by the intra prediction block 56. The main encoding pipeline 48 may be capable of implementing multiple (e.g., 13, 17, 25, 29, 35, 38, or 43) different intra prediction modes to generate luma prediction samples based on adjacent pixel image data. Thus, in some embodiments, the intra prediction block 56 may determine a candidate intra prediction mode and corresponding luma prediction sample for a prediction unit based at least in part on luma of reconstructed image data for adjacent (e.g., top, top right, left, or bottom left) pixels, which may be generated by the reconstruction block 60.

For example, utilizing a vertical prediction mode, the intra prediction block 56 may set each column of a luma prediction sample equal to reconstructed luma of a pixel directly above the column. Additionally, utilizing a DC prediction mode, the intra prediction block 56 may set a luma prediction sample equal to an average of reconstructed luma of pixels adjacent the prediction sample. The intra prediction block 56 may then input candidate intra prediction modes and corresponding luma prediction samples to the mode decision block 58 for consideration. In some embodiments, the intra prediction block 56 may sort the candidate intra prediction modes based on associated mode cost and input only a specific number to the mode decision block 58.

The mode decision block 58 may determine encoding parameters to be used to encode the source image data (e.g., a CTU). In some embodiments, the encoding parameters for a CTU may include prediction technique (e.g., intra prediction techniques or inter prediction techniques) for the CTU, number of prediction units in the CTU, size of the prediction units, prediction mode (e.g., intra prediction modes or inter prediction modes) for each of the prediction units, number of transform units in the CTU, size of the transform units, whether to split the CTU into smaller CTUs, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each CTU in the image frame may be prediction encoded using intra prediction techniques.

On the other hand, in a P-frame or B-frame, source image data may be encoded by referencing image data used to display the same image frame and/or a different image frames. More specifically, in a P-frame, source image data may be encoded by referencing image data associated with a previously coded or transmitted image frame. Additionally, in a B-frame, source image data may be encoded by referencing image data used to code two previous image frames. More specifically, with a B-frame, a prediction sample may be generated based on prediction samples from two previously coded frames; the two frames may be different from one another or the same as one another. Accordingly, when the image frame is a P-frame or a B-frame, the mode decision block 58 may determine that each CTU in the image frame may be prediction encoded using either intra prediction techniques or inter prediction techniques.

Although using the same prediction technique, the configuration of luma prediction blocks in a CTU may vary. For example, the CTU may include a variable number of luma prediction blocks at variable locations within the CTU, which each uses a different prediction mode. As used herein, a "prediction mode configuration" is intended to describe the number, size, location, and prediction mode of luma prediction blocks in a CTU. Thus, the mode decision block 58 may determine a candidate inter prediction mode configuration using one or more of the candidate inter prediction modes received from the inter prediction block 54. Additionally, the mode decision block 58 may determine a candidate intra prediction mode configuration using one or more of the candidate intra prediction modes received from the intra prediction block 56.

Since a CTU may utilize the same prediction technique, the mode decision block 58 may determine prediction technique for the CTU by comparing rate-distortion metrics (e.g., costs) associated with the candidate prediction mode configurations and/or a skip mode. In some embodiments, the rate-distortion metric may be determined by summing a first product obtained by multiplying an estimated rate that indicates number of bits expected to be used to indicate encoding parameters and a first weighting factor for the estimated rate and a second product obtained by multiplying a distortion metric (e.g., sum of squared difference) resulting from the encoding parameters and a second weighting factor for the distortion metric. The first weighting factor may be a Lagrange multiplier, and the first weighting factor may depend on a quantization parameter associated with image data being processed.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the reconstruction block 60. Additionally or alternatively, the distortion metric may be a sum of absolute transformed difference (SATD) between the luma coding block and reconstructed luma image data received from the reconstruction block 60.

In some embodiments, prediction residuals (e.g., differences between source image data and prediction sample) resulting in a CTU may be transformed as one or more transform units. As used herein, a "transform unit" is intended to describe a sample within a CTU that is transformed together. In some embodiments, a CTU may include a single transform unit. In other embodiments, the CTU may be divided into multiple transform units that are each separately transformed.

Additionally, the estimated rate for an intra prediction mode configuration may include expected number of bits used to indicate intra prediction technique (e.g., CTU overhead), expected number of bits used to indicate intra prediction mode, expected number of bits used to indicate a prediction residual (e.g., source image data—prediction sample), and expected number of bits used to indicate a transform unit split. On the other hand, the estimated rate for an inter prediction mode configuration may include expected number of bits used to indicate inter prediction technique, expected number of bits used to indicate a motion vector (e.g., motion vector difference), and expected number of bits used to indicate a transform unit split. Additionally, the estimated rate of the skip mode may include number of bits expected to be used to indicate the CTU when prediction encoding is skipped.

In embodiments where a rate-distortion metric is used, the mode decision block 58 may select a prediction mode configuration or skip mode with the lowest associated rate-distortion metric for a CTU. In this manner, the mode decision block 58 may determine encoding parameters for a CTU, which may include prediction technique (e.g., intra prediction techniques or inter prediction techniques) for the CTU, number of prediction units in the CTU, size of the prediction units, prediction mode (e.g., intra prediction modes or inter prediction modes) for each of the prediction unit, number of transform units in the coding block, size of the transform units, whether to split the CTU into smaller CTUs, or any combination thereof.

To facilitate improving perceived image quality resulting from decoded image data, the main encoding pipeline 48 may then mirror decoding of encoded image data. To facilitate, the mode decision block 58 may output the encoding parameters and/or luma prediction samples to the reconstruction block 60. Based on the encoding parameters and reconstructed image data associated with one or more adjacent blocks of image data, the reconstruction block 60 may reconstruct image data.

More specifically, the reconstruction block 60 may generate the luma component of reconstructed image data. In some embodiments, the reconstruction block 60 may generate reconstructed luma image data by subtracting the luma prediction sample from luma of the source image data to determine a luma prediction residual. The reconstruction block 60 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The reconstruction block 60 may then add the reconstructed luma prediction residual to the luma prediction sample to determine reconstructed luma image data. As described above, the reconstructed luma image data may then be fed back for use in other blocks in the main encoding pipeline 48, for example, via storage in the internal memory 50 of the encoder circuitry 34. Additionally, the reconstructed luma image data may be output to the filter block 62.

The reconstruction block 60 may also generate both chroma components of reconstructed image data. In some embodiments, chroma reconstruction may be dependent on sampling format. For example, when luma and chroma are sampled at the same resolution (e.g., 4:4:4 sampling format), the reconstruction block 60 may utilize the same encoding parameters as used to reconstruct luma image data. In such embodiments, for each chroma component, the reconstruction block 60 may generate a chroma prediction sample by applying the prediction mode configuration determined by the mode decision block 58 to adjacent pixel image data.

The reconstruction block 60 may then subtract the chroma prediction sample from chroma of the source image data to determine a chroma prediction residual. Additionally, the reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, which may be input to the filter block 62.

However, in other embodiments, chroma sampling resolution may vary from luma sampling resolution, for example when a 4:2:2 or 4:2:0 sampling format is used. In such embodiments, encoding parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decoded image data, the filter block 62 may filter the reconstructed image data (e.g., reconstructed chroma image data and/or reconstructed luma image data). In some embodiments, the filter block 62 may perform deblocking and/or sample adaptive offset (SAO) functions. For example, the filter block 62 may perform deblocking on the reconstructed image data to reduce perceivability of blocking artifacts that may be introduced. Additionally, the filter block 62 may perform a sample adaptive offset function by adding offsets to portions of the reconstructed image data.

To facilitate decoding, encoding parameters used to generate encoded image data may be communicated to a decoding device. In some embodiments, the encoding parameters may include the encoding parameters determined by the mode decision block 58 (e.g., prediction unit configuration and/or transform unit configuration), encoding parameters used by the reconstruction block 60 (e.g., quantization coefficients), and encoding parameters used by the filter block 62. To facilitate communication, the encoding parameters may be expressed as syntax elements. For example, a first syntax element may indicate a prediction mode (e.g., inter prediction mode or intra prediction mode), a second syntax element may indicate a quantization coefficient, a third syntax element may indicate a configuration of prediction units, and a fourth syntax element may indicate a configuration of transform units.

A duration provided for encoding image data may be limited in some instances, such as to facilitate real-time or near real-time display and/or transmission. The low-resolution pipeline 46 of the encoder circuitry 34 may be configured to improve operational efficiency (e.g., operating duration and/or power consumption) of the main encoding pipeline 48. To that end, the low-resolution pipeline 46 may include a scaler block 63 and a low-resolution motion estimation block 65. The scaler block 63 may be configured to receive image data and downscale the image data (e.g., a CTU) to generate low-resolution image data. For example, the scaler block 63 may downscale a 32×32 CTU to one-sixteenth resolution to generate an 8×8 downscaled CTU. In some embodiments, such as embodiments in which preprocessing circuitry generates image data (e.g., low-resolution image data) from source image data, the low-resolution pipeline may not include the scaler block 63, or the scaler block 63 may not be utilized to downscale image data. The low-resolution motion estimation block 65 may improve operational efficiency by initializing the motion estimation block 52 with candidate inter prediction modes, which may facilitate reducing searches performed by the motion estimation block 52. Additionally, the low-resolution motion estimation block 65 may improve operational efficiency by generating global motion statistics that may be utilized by the motion estimation block 52 to determine a global motion vector.

The encoder circuitry 34 may also include MCTF circuitry 66 communicatively coupled to the DMA circuitry 36, the main encoding pipeline 48, and the low-resolution pipeline 46. The MCTF circuitry 66 may perform various functions to apply temporal filtering operations along one or more motion trajectories of source image data. To that end, the MCTF circuitry 66 may receive motion vectors from one or more of the DMA circuitry 36, the main encoding pipeline 48, and the low-resolution pipeline 46. The MCTF circuitry 66 may be configured to retrieve or fetch source pixel values and reference pixel values based on the received motion vectors. The MCTF circuitry 66 may perform motion vector refinement operations on the received motion vectors, based on the retrieved source pixel values and reference pixel values, to generate refined motion vectors. The MCTF circuitry 66 may perform temporal filtering operations on the fetched source pixel values and reference pixel values, based on the refined motion vectors, to generate filtered pixel values for image data output by the MCTF circuitry 66. Such temporal filtering operations may include block-based operations that are applied to blocks of pixel data.

As described above, image data may include spatial artifacts (e.g., blocking artifacts) related to MCTF operations such as the temporal filtering operations of the MCTF circuitry 66. Motion field discontinuities associated with the image data may contribute to such spatial artifacts. Motion field discontinuities generally refer to abrupt changes in motion associated with neighboring blocks of pixel data within image data. For example, image data may include a first block of pixel data and a second block of pixel data that form neighboring blocks of pixel data within the image data. The first block of pixel data may be associated with a moving object (e.g., a child). The second block of pixel data may be associated with a stationary object or background (e.g., a slide). A first motion vector corresponding to the first block of pixel data may have a magnitude that is greater than a magnitude of a second motion vector corresponding to the second block of pixel data. A magnitude difference between the first and second motion vectors that exceeds a threshold may indicate a motion vector edge or motion field discontinuity associated with the image data. Applying MCTF operations to the image data with that motion vector edge or motion field discontinuity may cause spatial artifacts (e.g., blocking artifacts) in the image data.

The MCTF circuitry 66 may perform edge detection operations on the received motion vectors to reduce blocking artifacts or other spatial artifacts related to MCTF operations. The edge detection operations performed by the MCTF circuitry 66 may involve comparing magnitudes of motion vectors corresponding to neighboring blocks of pixel data. A filtering strength of the MCTF circuitry 66 may be adjusted based on a magnitude difference between those motion vectors. The filtering strength may be inversely related to the magnitude difference. In this way, blocking artifacts or other spatial artifacts related to MCTF operations may be reduced by reducing pixel data blending proximate to motion vector edges or motion field discontinuities.

Figure 7A:
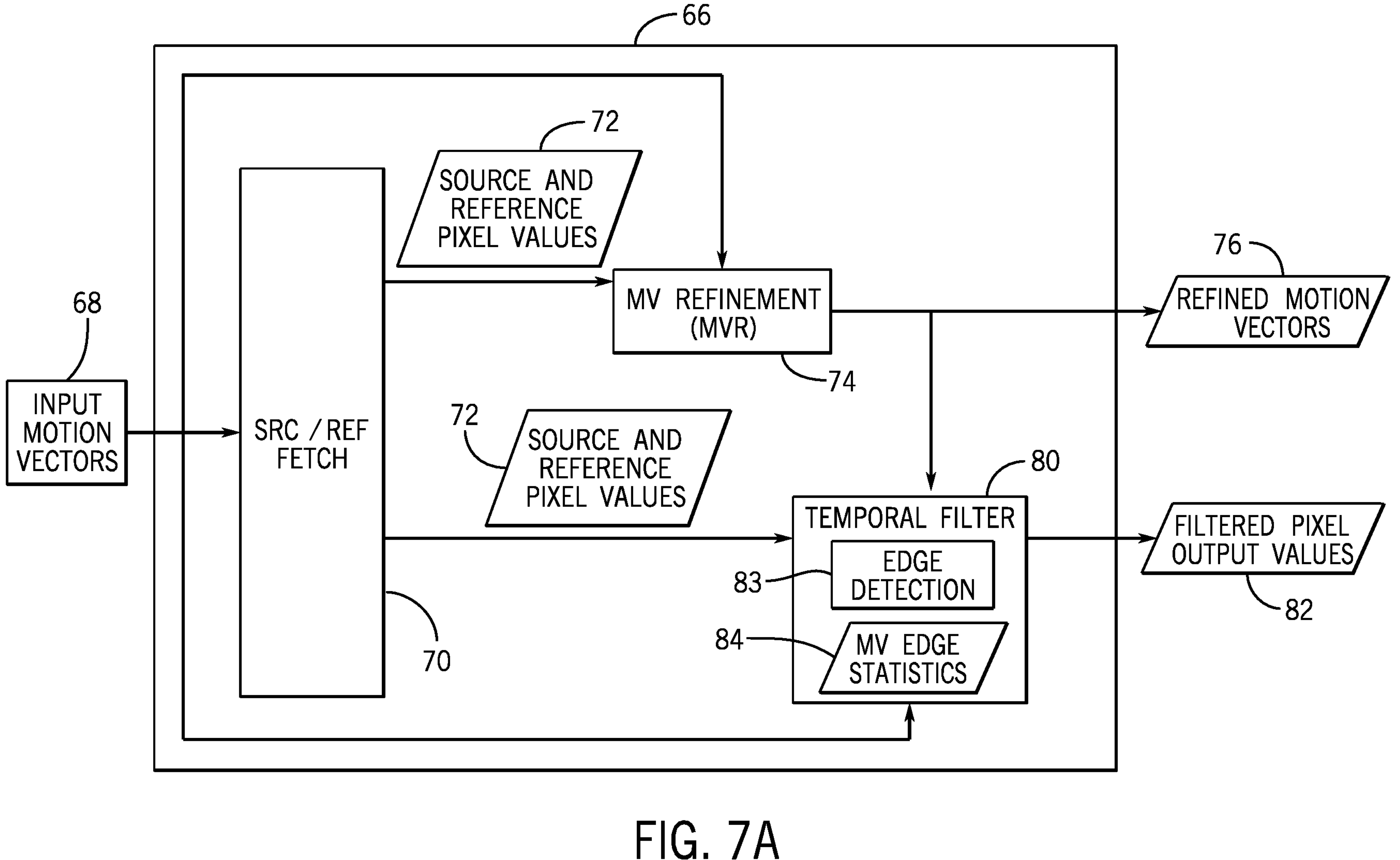
FIG. 7A is a block diagram that illustrates MCTF circuitry of the encoder circuitry of FIG. 6 that implements motion vector edge detection using motion vector refinement circuitry, in accordance with one or more embodiments.
Figure 7B:
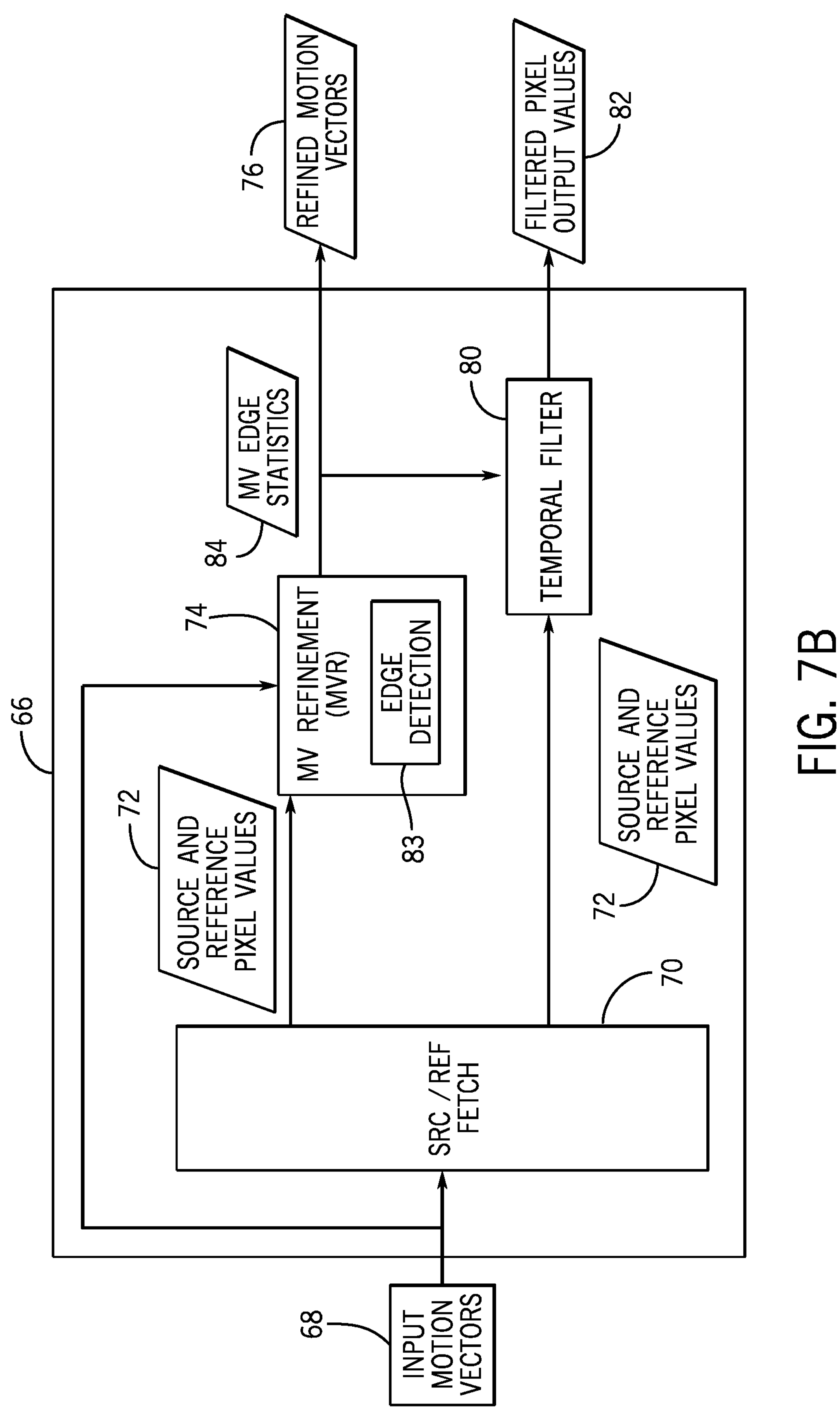
FIG. 7B is a block diagram that illustrates MCTF circuitry of the encoder circuitry of FIG. 6 that implements motion vector edge detection using temporal filtering circuitry, in accordance with one or more embodiments.

The MCTF circuitry 66 may perform various functions to enable temporal filtering of image data. To simplify discussion, those functions are divided between various blocks (e.g., circuitry, modules) in the example implementations of the MCTF circuitry 66 shown by FIGS. 7A and 7B. As shown by FIGS. 7A and 7B, the MCTF circuitry 66 may receive input motion vectors 68 as input. The MCTF circuitry 66 may receive the input motion vectors 68 from one or more of the DMA circuitry 36, the main encoding pipeline 48, and the low-resolution pipeline 46. For example, the input motion vectors 68 may include motion vectors produced by operation of the main encoding pipeline 48 and/or the low-resolution pipeline 46.

With reference to FIGS. 7A and 7B, the input motion vectors 68 may be used by a source and reference fetch block 70 to determine source pixel values and reference pixel values 72 that correspond to the input motion vectors 68. The source and reference pixel values 72 determined by the source and reference fetch block 70 may be sent to a motion vector refinement (MVR) block 74 and to a temporal filter block 80 for further processing. In an embodiment, the source and reference fetch block 70 includes hardware configured to determine the source and reference pixel values 72 based on the input motion vectors 68.

The source and reference fetch block 70 may fetch the source pixels corresponding to a current CTU of the input motion vectors 68. The current CTU may be 32×32 pixels and include 16×16 block of chroma pixels per component. This may include an additional row of pixels (e.g., additional 33 pixels) and a column of luma pixels (e.g., 32 luma pixels) that may be above and to the left of the current CTU, respectively. This may determine the 33×33 source luma block that will be used in later motion vector refinement and temporal filtering operations. Also, for each chroma component determined by the source and reference fetch block 70, an additional row and column of chroma pixels may be used above and to the left of the current CTU, respectively. The additional row and column of chroma pixels may form a block of pixels (e.g., a 17×17 block) that may be up-sampled to form an up-sampled block of pixels (e.g., a 34×34 block).

The search and reference fetch block 70 may use the input motion vectors 68 to determine the exact location of the reference chroma pixels (e.g., 4×4 block) to be fetched that correspond to the luma pixel block. The fetched chroma pixels full-pel position may be off by a half-pel distance relative to the fetched luma full-pel position. The refined chroma pixels may be a distance away from both an even and/or odd motion vector in the center of the fetched chroma full-pel position. The maximum distance from chroma full-pel position may be −1.25 to 1.75 pixels, or any suitable maximum distance for use in temporal filtering. The reference chroma pixel may be fetched in 8×8 blocks at a time including surrounding 2 pixels on all four sides of the 8×8 blocks, or based on any suitable chroma block size. Additionally, the motion vectors may be used to determine blocks to be fetched for the reference luma pixels. The reference luma pixels are fetched in certain number of blocks at a time, including the additional surrounding pixels. The blocks selected by the refined motion vector may be at the center of the CTU block.

Figure 8:
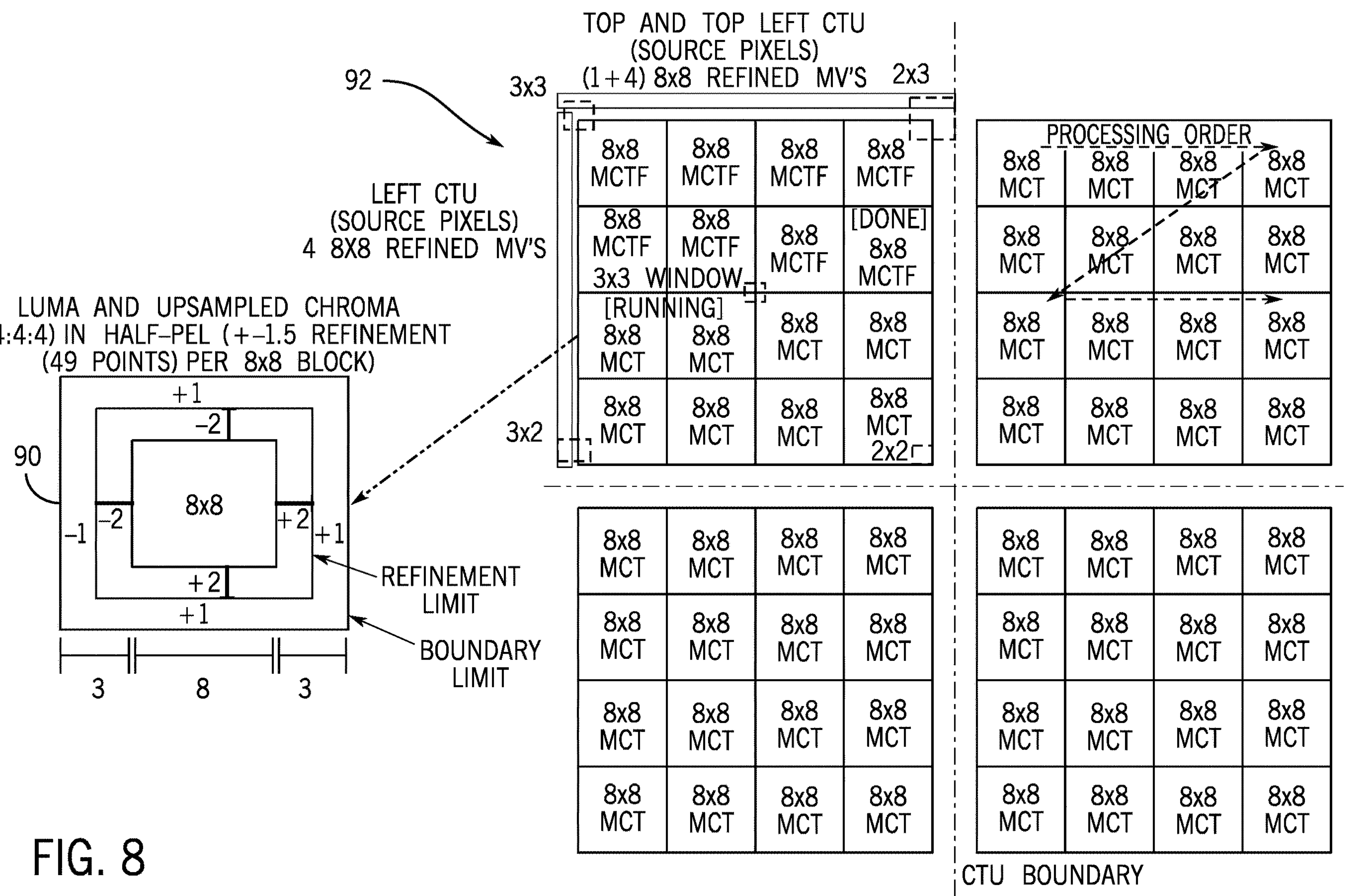
FIG. 8 is a diagrammatic representation of motion vector refinement completed via the MCTF circuitry of FIGS. 7A and/or 7B, in accordance with an embodiment.

The MVR block 74 may refine the input motion vectors 68 based on the source and reference pixel values 72 provided by the source and reference fetch block 70. With reference to FIG. 8, the MVR block 74 may refine the input motion vectors 68 corresponding to a given source pixel CTU 92 around a specified window (e.g., ±1.5) in sub-pel precision. To perform the sub-pel refinement of the motion vectors corresponding to each source pixel block 90 (e.g., each 8×8 source pixel block), bilinear interpolation may be completed on the source pixel blocks 90. For example, each source pixel block 90 may include luma pixel values and up-sampled chroma pixel values in half-pel precision (e.g., forty-nine points per 8×8 source pixel block).

The MVR block 74 may refine the motion vectors corresponding to the source pixel CTU 92 in source pixel blocks 90 of a given block size (e.g., 8×8-pixel blocks, 16×16-pixel blocks, 32×32-pixel blocks). A number of candidate motion vectors evaluated by the MVR block 74 for each source pixel block 90 of the source pixel CTU 92 may be based on the given block size. For example, the MVR block 74 may evaluate forty-nine candidate motion vectors for each source pixel block 90. As shown by FIG. 8, the MVR block 74 may refine the motion vectors corresponding to multiple source pixel CTUs 92 that each include multiple source pixel blocks 90.

The MVR block 74 may evaluate each candidate motion vector based on a respective cost. The MVR block 74 may determine a respective cost for each candidate motion vector being evaluated based on a difference between the source and reference pixels of a corresponding source pixel block 90. For example, the difference may include a sum of absolute difference (SAD) between respective luma values of source and reference pixels of the corresponding source pixel block 90. The MVR block 74 may also determine a cost for each candidate motion vector being evaluated based on a lambda motion vector term. The lambda motion vector term may be an unsigned fixed-point multiplier that balances the distortion within the corresponding source pixel block 90 with a penalty component (e.g., a penalty motion vector term). The penalty component may measure a smoothness of each candidate motion vector compared to or relative to neighboring motion vectors.

Figure 9:
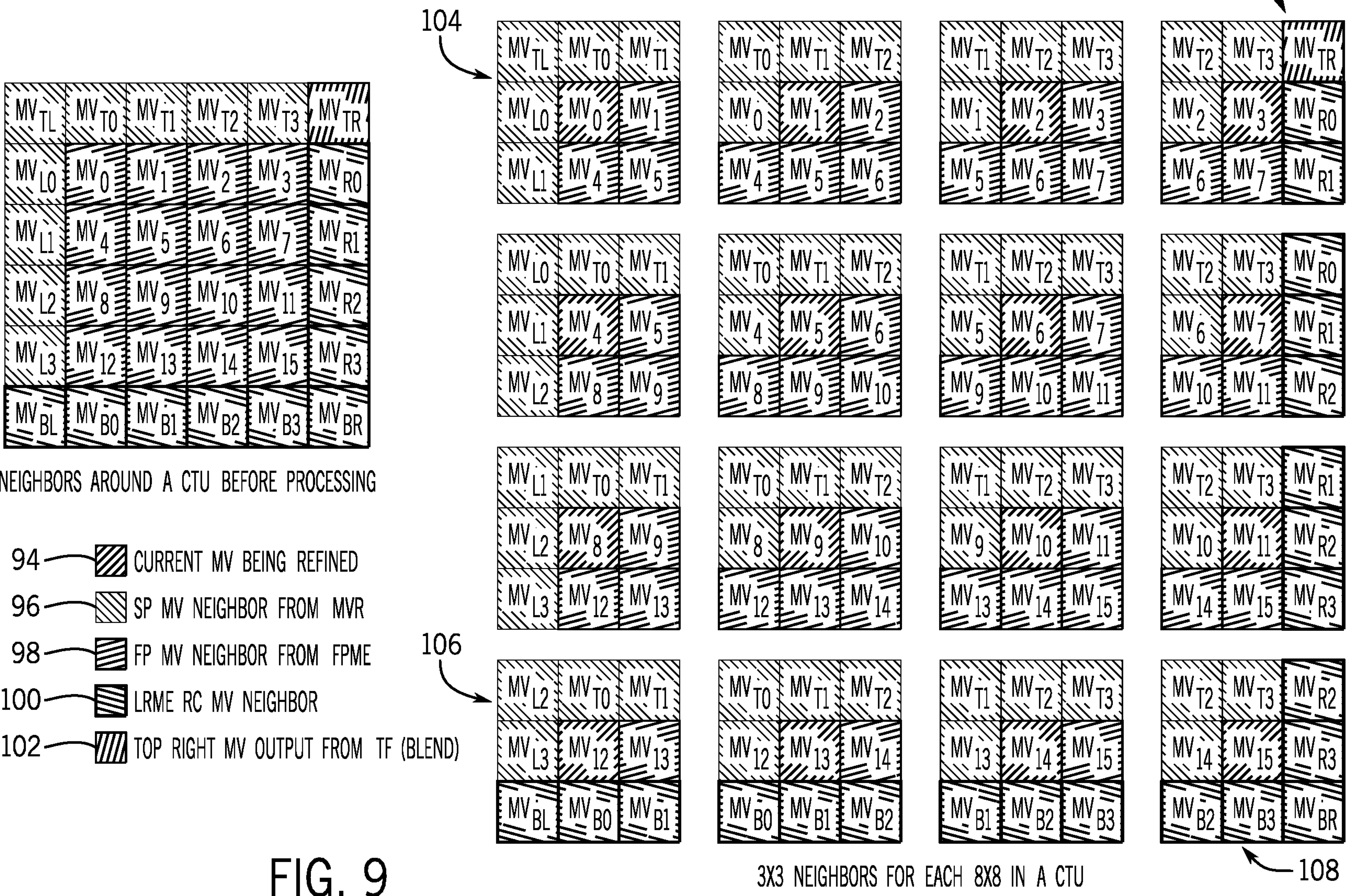
FIG. 9 is diagrammatic representation of motion vector refinement using motion vector neighbor values, in accordance with an embodiment.

With reference to FIG. 9, the MVR block 74 may use a neighbor motion vector set comprising a number (e.g., eight) of neighboring motion vectors to evaluate each current candidate motion vector 94. When evaluating a current candidate motion vector 94, the evaluation may use a previously refined motion vector 96 (e.g., a motion vector most recently refined by the MVR block 74) for determining the penalty component, if available. If no previously refined motion vector 96 is available, the evaluation may use full-resolution motion vectors 98 (e.g., motion vectors from the motion estimation block 52), low-resolution motion vectors 100 (e.g., motion vectors from the low-resolution motion estimation block 65), and averaged motion vectors 102 (e.g., motion vectors from the temporal filter block 80 scaled to sub-pel precision such as half-pel precision) should be utilized for determining the penalty component in the prior referenced order.

Different neighboring motion vectors may be available for motion vector refinement based on a position of a corresponding source pixel block (e.g., source pixel block 90)

within a source pixel CTU (e.g., source pixel CTU 92). For example, neighboring motion vectors in a neighbor motion vector set 104 include previously refined motion vectors 96 and full-pipeline motion vectors 98. As another example, neighboring motion vectors in a neighbor motion vector set 106 include previously refined motion vectors 96, a full-pipeline motion vector 98, and low-resolution motion vectors 100. As another example, neighboring motion vectors in a neighbor motion vector set 108 include previously refined motion vectors 96 and low-resolution motion vectors 100. As another example, neighboring motion vectors in a neighbor motion vector set 110 include previously refined motion vectors 96, full-pipeline motion vectors 98, low-resolution motion vectors 100, and an averaged motion vectors 102.

After determining a cost of each candidate motion vector, the MVR block 74 may select a motion vector associated with a lowest cost within the number of candidate motion vectors being evaluated for each source pixel block 90 (e.g., each 8×8 source pixel block). With reference to FIGS. 7A and 7B, the MVR block 74 may output the selected candidate motion vector as a refined motion vector 76. In some cases, two or more candidate motion vectors may have a same cost. In such cases, the candidate motion vector with a smallest length may be selected as the refined motion vector 96. In some cases, two or more candidate motion vectors may have a same cost and a same length. In such cases, an order (e.g., a raster order) in which candidate motion vectors enter a sorter may be used to select he motion vector that is sorted first is selected as the refined motion vector.

As described above, applying MCTF operations (e.g., filtering operations by the temporal filter block 80) to image data with motion vector edges or motion field discontinuities may cause spatial artifacts (e.g., blocking artifacts) in the image data. With reference to FIGS. 7A and 7B, the MCTF circuitry 66 may perform edge detection operations on motion vectors associated with the image data to reduce blocking artifacts or other spatial artifacts related to MCTF operations. To that end, an edge detection block 83 of the MCTF circuitry 66 may receive motion vectors associated with the source and reference pixel values 72 provided by the source and reference fetch block 70. The motion vectors associated with the source and reference pixel values 72 may include one or more of the input motion vectors 68 and the refined motion vectors 76. The edge detection block 83 may receive the motion vectors associated with the source and reference pixel values 72 from one or more of the DMA circuitry 36, the main encoding pipeline 48, the low-resolution pipeline 46, and the MVR block 74.

The edge detection block 83 may be configured to determine motion vector edge statistics 84 based on the motion vectors associated with the source and reference pixel values 72. The edge detection block 83 may determine the motion vector edge statistics 84 by evaluating respective magnitudes of the motion vectors (e.g., the input motion vectors 68 and/or the refined motion vectors 76) around a specified window (e.g., a 3×3-window) in sub-pel precision (e.g., half-pel precision). The evaluation may take place in source pixel blocks of a given block size (e.g., 8×8-pixel blocks). The motion vector edge statistics 84 may be provided to the temporal filter block 80 to adjust a filtering strength of MCTF operations. Different blocks of the MCTF circuitry 66 may include the edge detection block 83. For example, the temporal filter block 80 includes the edge detection block 83 in the implementation of FIG. 7A. As another example, the MVR block 74 includes the edge detection block 83 in the implementation of FIG. 7B.

The motion vector edge statistics 84 may include magnitude differences between neighboring motion vectors within each specified window. The neighboring motion vectors within each specified window may be a subset of the motion vectors associated with the source and reference pixel values 72 that form a neighbor motion vector set (e.g., the neighbor motion vector sets 104, 106, 108, and/or 110 of FIG. 9). The neighboring motion vectors within each specified window may be associated with a particular source pixel block (e.g., the source pixel block 90). In an embodiment, the neighboring motion vectors within each specified window may be the same as the ones used during motion vector refinement. As such, different neighboring motion vectors may be available for determining the motion vector edge statistics 84 based on a position of an associated source pixel block (e.g., source pixel block 90) within a source pixel CTU (e.g., source pixel CTU 92). In an embodiment, a centered motion vector within each specified window may be a refined motion vector determined during motion vector refinement.

In an embodiment, the magnitude differences may include first offset differences (e.g., horizontal offset differences) and second offset differences (e.g., vertical offset differences) between neighboring motion vectors. Each neighboring motion vector may include a first offset component (e.g., a horizontal offset component or an x-component) and a second offset component (e.g., a vertical offset component or a y-component). A first offset difference may be a difference between respective first offset components of neighboring motion vectors. A second offset difference may be a difference between respective second offset components of neighboring motion vectors.

The motion vector edge statistics 84 may also include an edge count associated with each source pixel block. The edge count may be indicative of a number of magnitude differences between neighboring motion vectors associated with the source pixel block that exceed a first threshold (e.g., a programmable value defined per pair of neighboring motion vectors). The edge detection block 83 may increment (e.g., increase) the edge count for each magnitude difference that exceeds the first threshold. Otherwise, such as when a magnitude difference is equal to or less than the first threshold, the edge detection block 83 may not increment (e.g., maintain a current value or refrain from increasing) the edge count.

The edge detection block 83 may detect motion vector edges or motion field discontinuities based on an edge count associated with each source pixel block and a second threshold (e.g., a programmable value defined per source pixel block). For example, the edge detection block 83 may compare the second threshold with an edge count determined for a particular source pixel block (e.g., the source pixel block 90). In this example, the edge detection block 83 may detect a motion vector edge or motion field discontinuity within the neighboring motion vectors associated with the source pixel block, if the edge count exceeds the second threshold. Otherwise, such as when the edge count is equal to or less than the second threshold, the edge detection block 83 may not detect a motion vector edge or motion field discontinuity within the neighboring motion vectors associated with the source pixel block.

The motion vector edge statistics 84 may also include a motion vector edge indicator (e.g., flag) corresponding to each source pixel block. A value of the motion vector edge indicator may signal to the temporal filter block 80 whether neighboring motion vectors associated with the source pixel block does or does not include a motion vector edge or motion field discontinuity. For example, the edge detection block 83 may set the value of the motion vector edge indicator to a first value if the neighboring motion vectors associated with the source pixel block do include a motion vector edge or motion field discontinuity. Otherwise, when the neighboring motion vectors associated with the source pixel block do not include a motion vector edge or motion field discontinuity, the edge detection block 83 may set the value of the motion vector edge indicator to a second value different than the first value.

The temporal filter block 80 may receive source and reference pixel values 72 provided by the source and reference fetch block 70. The temporal filter block 80 may also receive the refined motion vectors 76 provided by the MVR block 74 and the motion vector edge statistics 84 provided by the edge detection block 83. The temporal filter block 80 may filter the source and reference pixel values 72 based on or using the refined motion vectors 76 and the motion vector edge statistics 84 to generate or produce filtered pixel output values 82. Input data received by the temporal filter block 80 for each source pixel block 90 may include the difference (e.g., the SAD between respective luma values) between source and reference pixels of the source pixel block that the MVR block 74 used when calculating the lowest candidate motion vector for the source pixel block. Input data received by the temporal filter block 80 for each source pixel block 90 may also include the averaged motion vector of nine 8×8 blocks in a specified window (e.g., a 3×3 window). A centered motion vector within each specified window may be a refined motion vector determined during motion vector refinement. Neighboring motion vectors within each specified window may be the same as the ones used during motion vector refinement. For example, the neighboring motion vectors within each specified window may form a neighbor motion vector set (e.g., the neighbor motion vector sets 104, 106, 108, and/or 110 of FIG. 9).

Figure 10:
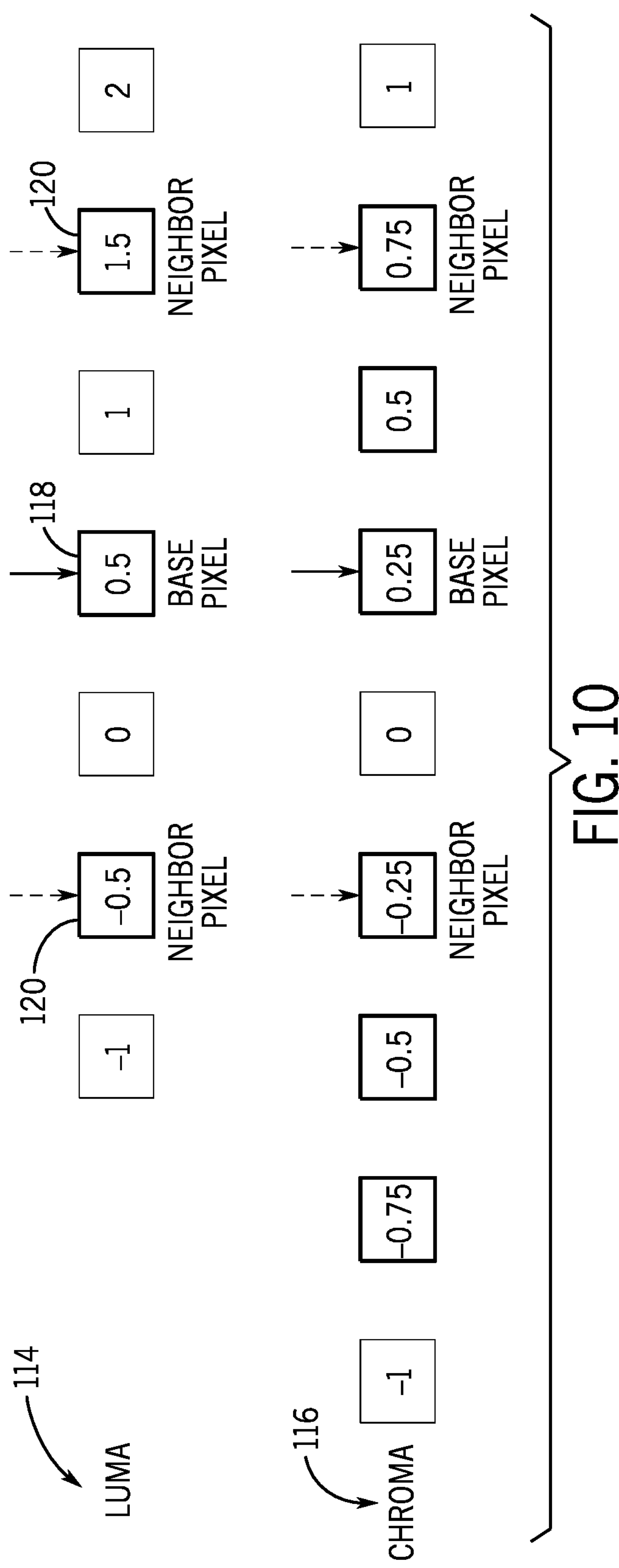
FIG. 10 is a diagrammatic representation of luma pixel value and chroma pixel value calculations for temporal filtering of pixel values, in accordance with an embodiment.

The temporal filter block 80 may perform filtering operations using the corresponding reference pixel blocks from all active reference frames in filtering each source pixel block. By way of example and with reference to FIG. 10, the source and reference pixel values 72 provided by the source and reference fetch block 70 may include luma pixel values 114 and chroma pixel values 116. The luma pixel values 114 and the chroma pixel values 116 may correspond to a base pixel 118 and neighbor pixels 120 within a specified window (e.g., a 3×3 window). The luma pixel values 114 within the specified window may be a full-pel distance from the base pixel 118. The chroma pixel values 116 within the specified window may be a half-pel distance from the base pixel 118. The base pixel 118 and the neighbor pixels 120 may be bilinear interpolated pixels with two adjacent full-pel pixels, in the case of the luma pixel values 114. The resulting input pixel values may be filtered, by performing a weighted combination of the source and reference pixel values 72.

With reference to FIGS. 7A and 7B, each filtering operation by the temporal filter block 80 may be carried out on a pixel-by-pixel basis. For each filtering operation, the temporal filter block 80 may calculate a weighted combination of the source and reference pixel values 72 based on a set of filter weights to generate the filtered pixel output values 82. The refined motion vectors 76 provided by the MVR block 74 and filtered pixel output values 82 produced by the temporal filter block 80 may be provided as output by the MCTF circuitry 66. The set of filter weights may include a pixel weight, a motion weight, and an infinite image response (IIR) weight. In an embodiment, the pixel weight may be a pixel-based weight, the motion weight may be a block-based weight, and the IIR weight may be a block-based weight.

The set of filter weights may control a filtering strength of each filtering operation. The temporal filter block 80 may adjust a filtering strength of each filtering operation based on the motion vector edge statistics 84 determined by the edge detection block 83. For example, the motion vector edge statistics 84 may indicate that a first source pixel value is associated with a motion vector edge or motion field discontinuity. In this example, the temporal filter block 80 may decrease a filtering strength (e.g., filter less aggressively) of a filtering operation performed on the first source pixel value based on the motion vector edge statistics 84. As another example, the motion vector edge statistics 84 may indicate that a second source pixel value is not associated with a motion vector edge or motion field discontinuity. In this example, the temporal filter block 80 may increase a filtering strength (e.g., filter more aggressively) or refrain from modifying the filtering strength of a filtering operation performed on the second source pixel value based on the motion vector edge statistics 84.

In an embodiment, the temporal filter block 80 may use filter weight data structures such as lookup tables (LUTs) to determine one or more of the pixel weight, the motion weight, and the IIR weight. Each filter weight data structure may include pre-computed values for a given filter weight (e.g., the pixel weight, the motion weight, and/or the IIR weight) stored in a memory. The temporal filter block 80 may use the filter weight data structures to replace inverse computations for the pixel difference weight, the motion vector weight, and/or IIR weight. In an embodiment, the memory may include one or more of the local memory 20, the main memory storage device 22, and external memory communicatively coupled to the MCTF circuitry 66 via the network interface 24 or the I/O ports 16.

In an embodiment, the temporal filter block 80 may use multiple filter weight data structures with each filter weight data structure corresponding to different filtering strengths. For example, the multiple filter weight data structures may include a first filter weight data structure associated with a first filter strength and a second filter weight data structure associated with a second filter strength less than the first filter strength. The temporal filter block 80 may use the first filter weight data structure to determine a given filter weight (e.g., a pixel difference weight and/or a motion vector weight) for a source pixel value when the motion vector edge statistics 84 indicate that the source pixel value is not associated with a motion vector edge or motion field discontinuity. Otherwise, the temporal filter block 80 may use the second filter weight data structure to determine the given filter weight when the motion vector edge statistics 84 indicate that the source pixel value is associated with a motion vector edge or motion field discontinuity.

Figure 11:
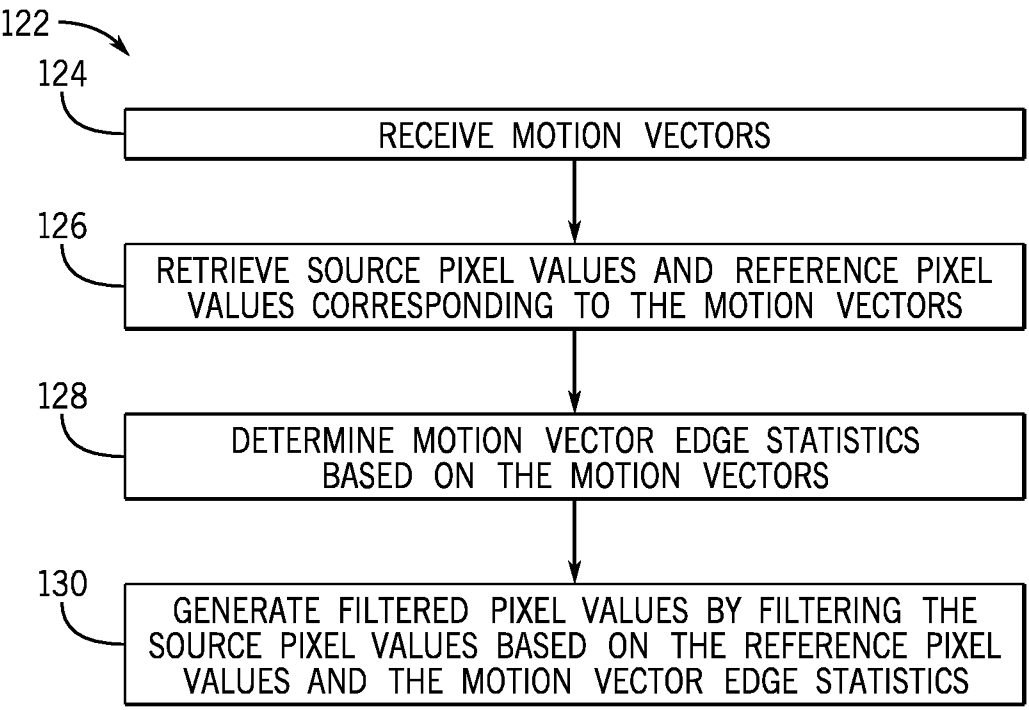
FIG. 11 is a flow diagram of a process for reducing spatial artifacts related to temporal filtering, in accordance with an embodiment.

With the foregoing in mind, FIG. 11 is a flow diagram of a process 122 for reducing spatial artifacts related to temporal filtering, in accordance with an embodiment. The MCTF circuitry 66, at process block 124 may receive a plurality of motion vectors (e.g., the input motion vectors 68). In an embodiment, the MCTF circuitry 66 may receive the plurality of motion vectors from one or more of the DMA circuitry 36, the main encoding pipeline 48, and the low-resolution pipeline 46. In an embodiment, the plurality of motion vectors may be received at one or more of the source and reference fetch block 70, the MVR block 74, the temporal filtering block 80, and the edge detection block 83.

The MCTF circuitry 66, at process block 126, retrieves a plurality of source pixel values and a plurality of reference pixel values from memory. The plurality of source pixel values and the plurality of reference pixel values corresponding to the plurality of motion vectors. For example, the MCTF circuitry 66 may include the source and reference fetch block 70 that is configured to determine the source and reference pixel values 72 based on the input motion vectors 68. In an embodiment, the memory may include one or more of the local memory 20, the main memory storage device 22, and external memory that stores image data, such as image data generated by the image sensor 30 or image data received via the network interface 24 or the I/O ports 16. In an embodiment, the MCTF circuitry 66 retrieves the plurality of source pixel values and the plurality of reference pixel values from the memory via the DMA circuitry 36. In an embodiment, the plurality of source pixel values and the plurality of reference pixel values may be received at one or more of the MVR block 74 and the temporal filtering block 80.

The MCTF circuitry 66, at process block 128, determines motion vector edge statistics based on the plurality of motion vectors. The motion vector edge statistics may include an edge count indicative of magnitude differences between neighboring motion vectors of the plurality of motion vectors that exceed a threshold. For example, the MCTF circuitry 66 may include the edge detection block 83 that is configured to determine the motion vector edge statistics 84 based on motion vectors (e.g., the input motion vectors 68 and/or the refined motion vectors 76). The edge detection block 83 may evaluate respective magnitudes of the plurality of motion vectors around a specified window size in sub-pel resolution (e.g., half-pel resolution) to determine the motion vector edge statistics 84. The evaluation may take place in source pixel blocks of a given block size (e.g., 8×8-pixel blocks). In an embodiment, the motion vector edge statistics 84 may be received at the temporal filtering block 80.

The MCTF circuitry 66, at process block 130, generates a plurality of filtered pixel values by filtering the plurality of source pixel values based on the plurality of reference pixel values and the motion vector edge statistics. For example, the MCTF circuitry 66 may include the temporal filter block 80 that is configured to perform filtering operations on source pixel blocks of a given block size using corresponding reference pixel blocks from all active reference frames. The temporal filter block 80 may adjust a filtering strength of the filtering operations based on the motion vector edge statistics 84 determined by the edge detection block 83. For example, the motion vector edge statistics 84 may indicate that a first source pixel value of the plurality of source pixel values is associated with a motion vector edge or motion field discontinuity. In this example, the temporal filter block 80 may decrease the filtering strength (e.g., filter less aggressively) of the filtering operations performed on the first source pixel value based on the motion vector edge statistics 84. As another example, the motion vector edge statistics 84 may indicate that a second source pixel value of the plurality of source pixel values is not associated with a motion vector edge or motion field discontinuity. In this example, the temporal filter block 80 may increase the filtering strength (e.g., filter more aggressively) or refrain from modifying the filtering strength of the filtering operations performed on the second source pixel value based on the motion vector edge statistics 84. In an embodiment, the plurality of filtered pixel values may be provided as output of the MCTF circuitry 66.

Figure 12:
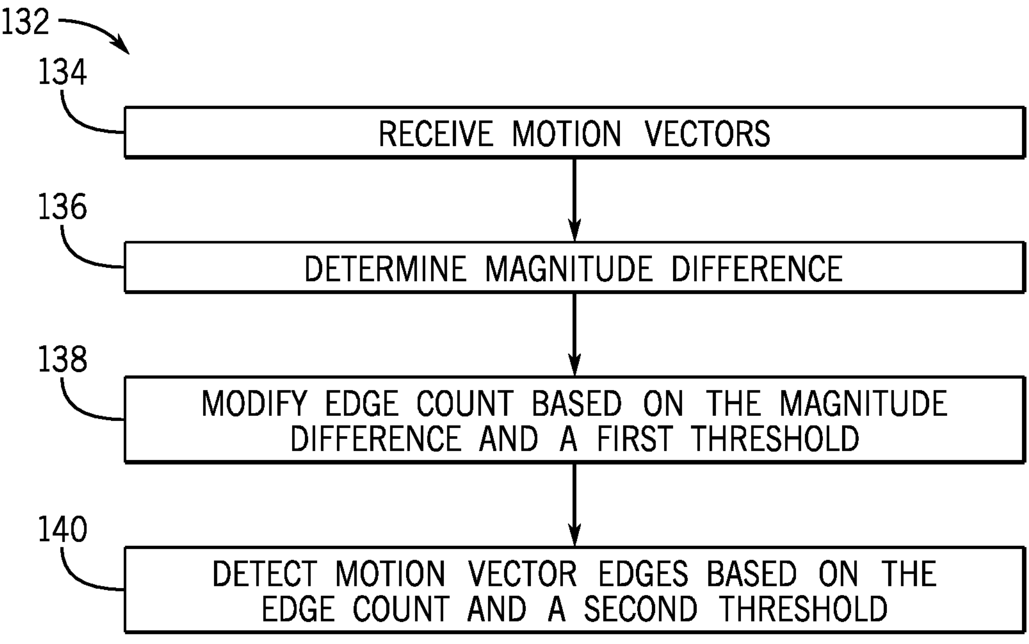
FIG. 12 is a flow diagram of a process of motion vector edge or motion field discontinuity detection operations, in accordance with an embodiment.

With the foregoing in mind, FIG. 12 is a flow diagram of a process 132 of motion vector edge or motion field discontinuity detection operations, in accordance with an embodiment. The process 132 may be performed by the edge detection block 83 of the MCTF circuitry 66. Accordingly, the process 132 may be performed at process block 128 of the process 122. The edge detection block 83, at process block 134, may receive a plurality of motion vectors (e.g., the input motion vectors 68 and/or the refined motion vectors 76). In an embodiment, the edge detection block 83 may receive the plurality of motion vectors from one or more of the DMA circuitry 36, the main encoding pipeline 48, the low-resolution pipeline 46, and the MVR block 74.

The edge detection block 83, at process block 136, may determine a magnitude difference between neighboring motion vectors of the plurality of motion vectors. The edge detection block 83 may determine the magnitude difference while evaluating respective magnitudes of the plurality of motion vectors around a specified window in sub-pel precision (e.g., half-pel precision). The evaluation may take place in source pixel blocks of a given block size (e.g., 8×8-pixel blocks). For example, the neighboring motion vectors may be a subset of the plurality of motion vectors within a given specified window that form a neighbor motion vector set (e.g., the neighbor motion vector sets 104, 106, 108, and/or 110 of FIG. 9). In this example, the neighbor motion vector set may include a first motion vector and a second motion vector adjacent to the first motion vector in the neighbor motion vector set. The first motion vector may be positioned in a center of the given specified window. The edge detection block 83 may determine the magnitude difference based on a difference between a first magnitude of the first motion vector and a second magnitude of the second motion vector.

The edge detection block 83, at process block 138, may modify an edge count based on the magnitude difference between neighboring motion vectors and a first threshold. The edge count may be indicative of a number of magnitude differences between neighboring motion vectors that exceed the first threshold. For example, the edge detection block 83 may increment the edge count if the magnitude difference exceeds the first threshold. Otherwise, such as when the magnitude difference is equal to or less than the first threshold, the edge detection block 83 may not increment (e.g., refrain from incrementing) the edge count. In an embodiment, the motion vector edge statistics 84 may include a different edge count for each source pixel block. In an embodiment, the edge detection block 83 may reset (e.g., set to zero) the edge count for each source pixel block.

The edge detection block 83, at process block 140, may detect motion vector edges or motion field discontinuities based on the edge count and a second threshold. For example, the edge detection block 83 may compare the edge count with the second threshold. In this example, the edge detection block 83 may detect that the neighboring motion vectors include a motion vector edge or motion field discontinuity if the edge count exceeds the second threshold. Otherwise, such as when the edge count is equal to or less than the second threshold, the edge detection block 83 may determine that the neighboring motion vectors do not include a motion vector edge or motion field discontinuity.

In an embodiment, the motion vector edge statistics 84 may include a motion vector edge indicator (e.g., flag) for a source pixel block associated with the neighboring motion vectors. In this embodiment, the edge detection block 83 may set a value of the motion vector edge indicator to signal whether the neighboring motion vectors associated with the source pixel block do or do not include a motion vector edge or motion field discontinuity. For example, the edge detection block 83 may set the value of the motion vector edge indicator to a first value if the neighboring motion vectors associated with the source pixel block do include a motion vector edge or motion field discontinuity. Otherwise, when the neighboring motion vectors associated with the source pixel block do not include a motion vector edge or motion field discontinuity, the edge detection block 83 may set the value of the motion vector edge indicator to a second value different than the first value. In an embodiment, the motion vector edge statistics 84 may include a different motion vector edge indicator (e.g., flag) for each source pixel block.

In an embodiment, the magnitude difference between the neighboring motion vectors may include a first offset difference (e.g., a horizontal offset difference) and a second offset difference (e.g., a vertical offset difference). The edge detection block 83 may determine the first offset difference based on a difference between respective first offset components (e.g., horizontal offset components or x-components) of the neighboring motion vectors. The edge detection block 83 may determine the second offset difference based on a difference between respective second offset components (e.g., vertical offset components or y-components) of the neighboring motion vectors.

In an embodiment, the edge detection block 83 may modify the edge count based on the first threshold and one or more of the first offset difference and the second offset difference. For example, the edge detection block 83 may increment the edge count when either the first offset difference or the second offset difference exceeds the first threshold. As another example, the edge detection block 83 may increment the edge count when both the first offset difference and the second offset difference exceed the first threshold. As another example, the edge detection block 83 may not increment (e.g., refrain from incrementing) the edge count when at least one of the first offset difference and the second offset difference is equal to or less than the first threshold.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:

memory; and motion compensated temporal filtering (MCTF) circuitry communicatively coupled to the memory, the MCTF circuitry configured to:

receive a plurality of motion vectors;

retrieve a plurality of source pixel values and a plurality of reference pixel values from the memory, wherein the plurality of source pixel values and the plurality of reference pixel values correspond to the plurality of motion vectors;

determine motion vector edge statistics based on the plurality of motion vectors, wherein the motion vector edge statistics comprise an edge count indicative of a number of magnitude differences between neighboring motion vectors of the plurality of motion vectors that exceed a first threshold; and generate a plurality of filtered pixel values by filtering the plurality of source pixel values based on the plurality of reference pixel values and the motion vector edge statistics.

2. The electronic device of claim 1, wherein the first threshold is a programmable value defined per pair of the neighboring motion vectors.

3. The electronic device of claim 1, wherein the neighboring motion vectors of the plurality of motion vectors comprise a first motion vector and a second motion vector adjacent to the first motion vector, and the MCTF circuitry is configured to determine the motion vector edge statistics by modifying the edge count based on the first threshold and a magnitude difference of the number of magnitude differences between the first motion vector and the second motion vector.

4. The electronic device of claim 3, wherein the magnitude difference includes a vertical offset difference and a horizontal offset difference, and modifying the edge count comprises incrementing the edge count when either the vertical offset difference or the horizontal offset difference exceeds the first threshold.

5. The electronic device of claim 1, wherein the MCTF circuitry is configured to detect motion vector edges based on a second threshold and the edge count associated with a source pixel block of the plurality of source pixel values.

6. The electronic device of claim 5, wherein the second threshold is a programmable value defined per source pixel block of the plurality of source pixel values.

7. The electronic device of claim 1, wherein the MCTF circuitry is configured to generate the plurality of filtered pixel values by adjusting a filtering strength of a filtering operation performed on a source pixel value of the plurality of source pixel values based on the motion vector edge statistics.

8. The electronic device of claim 7, wherein adjusting the filtering strength of the filtering operation based on the motion vector edge statistics comprises decreasing the filtering strength based on the motion vector edge statistics indicating that the source pixel value is associated with a motion vector edge.

9. The electronic device of claim 1, wherein the memory is configured to store a plurality of filter weight data structures that each include pre-computed values for a filter weight that controls a filtering strength of the MCTF circuitry.

10. The electronic device of claim 9, wherein each filter weight data structure of the plurality of filter weight data structures is associated with a different filtering strength.

11. The electronic device of claim 1, wherein receiving the plurality of motion vectors comprises generating a plurality of refined motion vectors by refining the plurality of motion vectors based on the plurality of source pixel values and the plurality of reference pixel values.

12. The electronic device of claim 1 comprising one or more of a low-resolution pipeline and a main encoding pipeline configured to generate the plurality of motion vectors.

13. A method comprising:

receiving, by motion compensated temporal filtering (MCTF) circuitry, a plurality of motion vectors;

retrieving, by the MCTF circuitry, a plurality of source pixel values and a plurality of reference pixel values based on the plurality of motion vectors;

determining, by the MCTF circuitry, motion vector edge statistics based on the plurality of motion vectors based on evaluating respective magnitudes of the plurality of motion vectors around a specified window size in sub-pel resolution; and generating, by the MCTF circuitry, a plurality of filtered pixel values by filtering the plurality of source pixel values based on the plurality of reference pixel values and the motion vector edge statistics.

14. The method of claim 13, wherein generating the plurality of filtered pixel values comprises adjusting a filtering strength of a filtering operation applied to a source pixel value of the plurality of source pixel values based on the motion vector edge statistics.

15. The method of claim 14, wherein adjusting the filtering strength of the filtering operation comprises decreasing the filtering strength of the filtering operation when the motion vector edge statistics indicate that the source pixel value is associated with a motion vector edge or motion field discontinuity.

16. The method of claim 13, wherein generating the plurality of filtered pixel values comprises determining filter weights for filtering operation using multiple filter weight data structures that each correspond to a different filtering strength.

17. A tangible, non-transitory, computer-readable medium, comprising instructions that, when executed by a processor, cause operations to be performed comprising:

receiving a plurality of motion vectors that correspond to a plurality of source pixel values;

determining motion vector edge statistics based on the plurality of motion vectors;

adjusting a filtering strength of temporal filtering operations applied to the plurality of source pixel values based on the motion vector edge statistics; and reducing pixel data blending proximate to motion vector edges or motion field discontinuities.

18. The tangible, non-transitory, computer-readable medium of claim 17, wherein the motion vector edge statistics comprise an edge count associated with the plurality of source pixel values.

19. The tangible, non-transitory, computer-readable medium of claim 18, wherein the edge count is indicative of a number of magnitude differences between neighboring motion vectors of the plurality of motion vectors that exceed a first threshold.

20. The tangible, non-transitory, computer-readable medium of claim 19, wherein the number of magnitude differences comprises horizontal offset differences between the neighboring motion vectors and vertical offset differences between the neighboring motion vectors.

* * * * *